United States Patent [19]

Kaczerginski et al.

[11] Patent Number: 4,476,081

[45] Date of Patent: Oct. 9, 1984

[54] METHOD OF MANUFACTURING AN ORGANIC INSULATOR

[75] Inventors: Alexandre Kaczerginski, Bellerive sur Allier; Laurent Pargamin, Vichy, both of France

[73] Assignee: Ceraver, Paris, France

[21] Appl. No.: 379,133

[22] Filed: May 17, 1982

[30] Foreign Application Priority Data

Jun. 1, 1981 [FR] France ............................... 81 10773

[51] Int. Cl.³ ............................................... B32B 31/06

[52] U.S. Cl. .................................... 264/262; 264/263; 264/272.13; 264/272.15; 264/328.16; 264/DIG. 54

[58] Field of Search ....................... 264/272.13, 272.15, 264/274, 261, 262, 272.11, 263, DIG. 54, 328.1, 328.16

[56] References Cited

U.S. PATENT DOCUMENTS

| | | | |
|---|---|---|---|
| 3,769,447 | 10/1973 | Quirk et al. | 264/262 X |
| 4,241,004 | 12/1980 | Hervig | 264/262 |
| 4,253,817 | 3/1981 | Stinton et al. | 264/261 X |

FOREIGN PATENT DOCUMENTS

| | | | |
|---|---|---|---|
| 669608 | 9/1953 | Canada | 264/272.11 |
| 2828375 | 12/1979 | Fed. Rep. of Germany . | |
| 1603508 | 5/1971 | France . | |
| 2419571 | 10/1979 | France . | |
| 492287 | 7/1970 | Switzerland . | |
| 1233310 | 5/1971 | United Kingdom . | |
| 2015831 | 9/1979 | United Kingdom . | |

*Primary Examiner*—Jay H. Woo
*Assistant Examiner*—James C. Housel
*Attorney, Agent, or Firm*—Kenyon & Kenyon

[57] ABSTRACT

The ends of a fiber-reinforced resin rod are inserted through sealing grommets into cavities of respective end fittings; the end fittings of the assembly are placed in accurately spaced end moulds; the rod is encased in intermediate half shells; an insulator covering is moulded around the rod by filling the half shells; and the end fittings are then fixed to the rod by embedding or swaging.

4 Claims, 3 Drawing Figures

METHOD OF MANUFACTURING AN ORGANIC INSULATOR

The present invention relates to a method of manufacturing an organic insulator which comprises a rod made of agglomerated fibres and whose ends are embedded in the cavities in respective end fittings. Outside the two embedding cavities, the rod is protected by an insulating covering which forms a sheath that may have fins.

BACKGROUND OF THE INVENTION

In accordance with a known method, the two ends of the rod are successively embedded in their end fittings and then the rigid assembly thus obtained is disposed in a moulding apparatus for casting the insulating covering thereover. In outline the molding apparatus has two end parts which surround the end fittings and between which two half shells are inserted which are shaped to match the covering to be formed. For proper connection of the covering to the edges of the end fittings, it is essential for the various component parts of the moulding apparatus to be positioned very accurately to these end fittings: in particular, this requires the distance between facing surfaces of the end fittings to be determined accurately once the two ends are embedded. Said requirement entails precise embedding operations.

Further, at the time of casting, the temperature of the moulding apparatus is a few hundreds of degrees centigrade depending on the insulator used, e.g. 200° C.; the parts of the steel mould, the end fittings generally made of aluminium or the like, and the fibre glass rod have different coefficients of expansion; this results in stresses on the rod and on the end fittings, which stresses can subsequently reduce the fixing power of the end fittings.

Lastly, the substance for embedding the rod is in danger of being damaged due to the fact that it is subjected to the high temperature of the mould.

Preferred implementations of the present invention remedy the above drawbacks.

SUMMARY OF THE INVENTION

The present invention provides a method of manufacturing an organic insulator which has a rod made of agglomerated fibres and whose ends are made fast in two respective cavities in two end fittings, the insulator as a whole being is provided with an insulator covering, in which method a seal is fitted on each end of the rod, said seals each fitting into a shoulder in the inside edge of the cavity of the corresponding end fitting, the assembly formed by the rod and the end fittings is disposed in a moulding apparatus, the relative positions of said end fittings and of said rod are adjusted, said insulator covering is moulded, and said ends of the rod are made fast with said end fittings.

According to a first variant, each end of the rod is made fast to its end fitting by inserting an embedding substance in said cavity through at least one opening in the end fitting provided for the purpose and communicating with the outside.

According to a second variant, each end of the rod is made fast to its end fitting by swaging said end fitting onto said end.

Such a method is economical since it uses a simple moulding apparatus and does not entail any tricky operation for positioning the rod and its end fittings in the mould; further, it prevents the above-mentioned mechanical stresses from occurring in the insulator.

BRIEF DESCRIPTION OF THE DRAWINGS

Other features and advantages of the present invention become apparent from the following description given by way of example with reference to the accompanying drawings, in which.

MORE DETAILED DESCRIPTION

Figure 1:
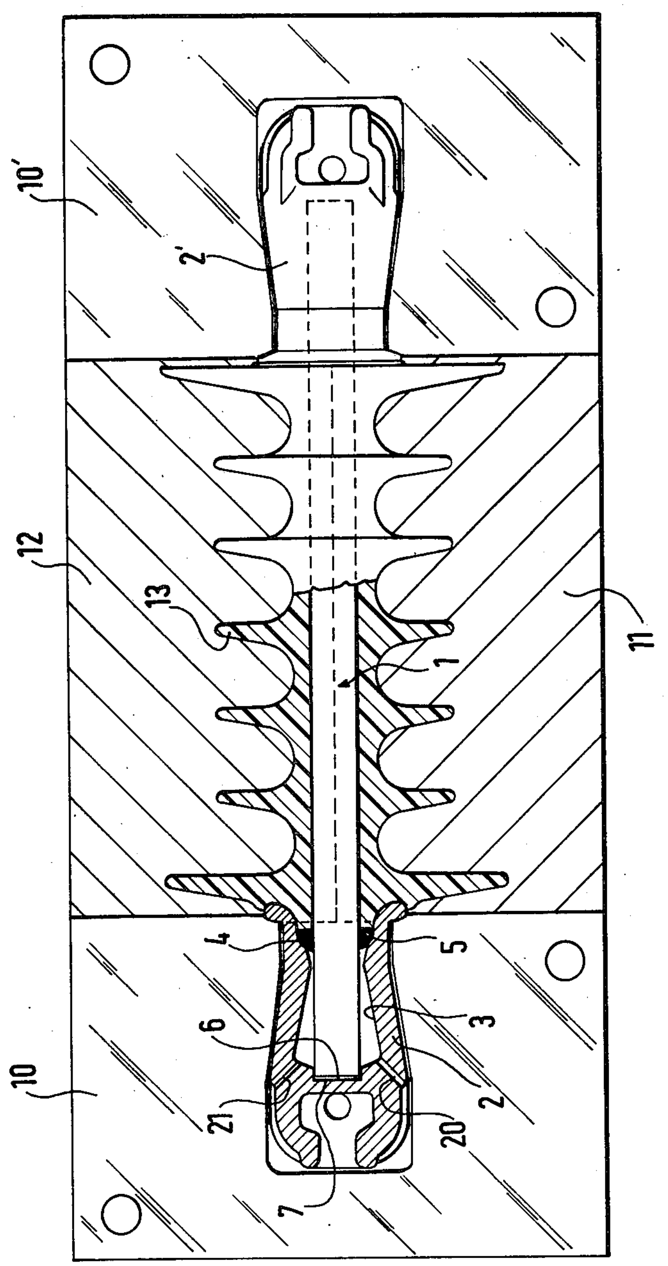
FIG. 1 is a partially cut away elevation showing an insulator in its mould after injection of the insulating substance.
Figure 2:
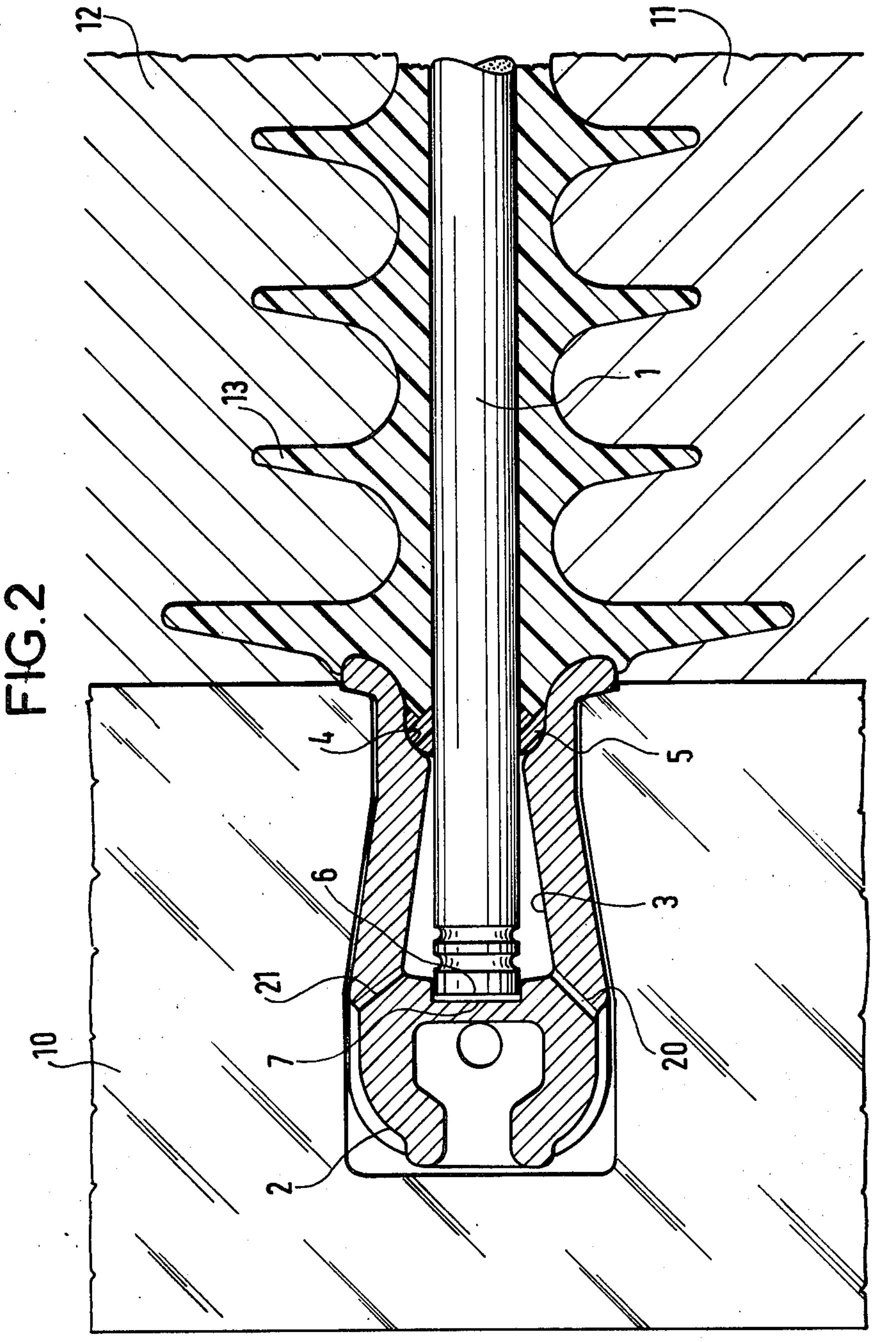
FIG. 2 shows a detail of FIG. 1 on a larger scale.

The figures illustrate two end fittings 2 and 2' and a rod 1 made of agglomerated glass fibres. Two seals are installed on the ends of said rod, only one of which seals 5 is actually shown in the figures. Said seal 5 is located in a recess defined by a shoulder 4 close to the rim of the cavity 3 in the end fitting 2. There remains some play between the end surface 6 of the rod 1 and the bottom 7 of the cavity 3. The seal 5 closes the cavity 3 and thus defines a recess for subsequently embedding the end of the rod 1. The opposite end of the rod 1 is disposed in the same way in the end fitting 2'. The end fittings 2 and 2' associated with the rod are placed in corresponding cavities in two end moulds 10 and 10', the distance between said end moulds being fixed and accurately defined; the adjustments of the positions of the end fittings is extremely easy.

To limit as much as possible the disadvantages due to the problems of expansion, the preceding operation can be carried out at a moderate temperature, e.g. in the order of 100° C. to allow easy manipulation of the various components.

When the position of the rod is adjusted in its end fittings, intermediate half shells 11 and 12 are set in position, and the insulator covering 13 is moulded e.g. by casting or by injection.

Under the effect of the casting or injection pressure of the insulating substance, the seal 5 is firmly pressed against the shoulder 4 and serves to seal the cavity 3.

After cooling, embedding masses are formed at each end of the rod in the corresponding cavities.

To do this, the end fitting 2 has two orifices which make the cavity 3 communicate with the outside. Orifice 20 is used to insert an embedding substance, while orifice 21 is used to remove air. When the cavity 3 is filled, closing stoppers, not illustrated, are screwed or force fitted into the orifices. It must be observed that it is also possible to perform the filling operation when the end fitting has only one orifice.

If it is advantageous to carry out the embedding operation before cooling the assembly, the embedding substance used could be of the compound type or of the charged epoxy type or of a type which is polymerisable in such temperature conditions. Of course, any other equivalent embedding method can be envisaged.

Figure 3:
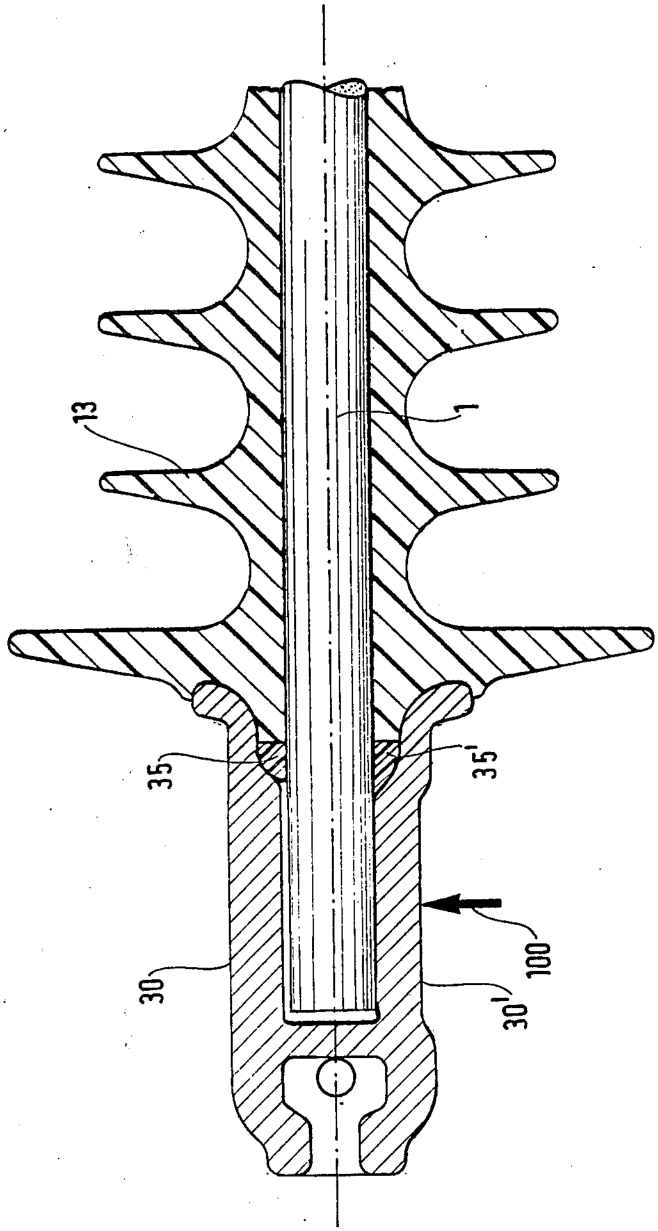
FIG. 3 is a partial section diagrammatically illustrating the operation of swaging an end fitting onto the rod.

As illustrated in FIG. 3, the rod 1 may be connected to its end fitting 30 by swaging when it is removed from the mould. The swaging force is referenced by an arrow 100, while the end fitting before swaging is referenced 30 and the same end fitting after swaging is referenced 30'. Any known type of swaging can be used. The seal 35 is greatly compressed at 35'.

Lastly, a connection method can be used such as the one described in CERAVER'S French patent application No. 78 06 749 published under No. 2 419 571. Such a method includes a pre-swaging phase on the collar of the end fitting on the seal 5 to further improve sealing before moulding of the insulator covering 13; it ends in embedding the rod in the end fitting by means of a sealing substance.

We claim:

1. A method of manufacturing an insulator having a fiber-reinforced rod with an outer surface and with two ends, the ends being fixed in cup-like cavities of respective end fittings, with the outer surface of the rod between the end fittings having a moulded insulator covering, the method comprising the following steps in sequence:

placing a seal ring on each end of such a fiber-reinforced rod, sliding each end of the fiber-reinforced rod into a flared entrance of a cup-like cavity formed in a corresponding end fitting so that each of the seals fit into a shoulder in the flared opening of the corresponding end fitting to form an unfixed insulator assembly;

positioning each end fitting of the insulator assembly into a corresponding one of two spaced apart ends of a mould apparatus;

moulding an insulator covering around the rod, the insulator covering making sealing abutment with each end fitting; and fixing the end fittings to the respective ends of the rod.

2. A method of manufacturing an insulator according to claim 1, wherein the step of fixing the end fittings to the respective ends of the rod comprises:

providing at least one passage spaced from the entrance of the cavity of each end fitting for communicating the cavity with the exterior of the fitting and inserting an embedding substance into said cavity through said passage.

3. A method of manufacturing an insulator according to claim 1, wherein the step of fixing the end fittings to the respective ends of the rods comprises swaging each end fitting onto the respective end.

4. A method of manufacturing an insulator according to claim 1, further comprising a step of bringing the mould apparatus to a temperature of approximately 100° C. prior to positioning the end fittings of the insulator assembly in the corresponding ends of the mould apparatus.

* * * * *

UNITED STATES PATENT AND TRADEMARK OFFICE
CERTIFICATE OF CORRECTION

PATENT NO. : 4,476,081

DATED : 9 October 1984

INVENTOR(S) : Alexandre KACZERGINSKI et al.

It is certified that error appears in the above—identified patent and that said Letters Patent is hereby corrected as shown below:

Column 1, line 49: delete "is".

Signed and Sealed this

*Thirteenth* Day of *August 1985*

[SEAL]

*Attest:*

DONALD J. QUIGG

*Attesting Officer* *Acting Commissioner of Patents and Trademarks*